United States Patent [19]

Kennedy

[11] 3,875,335

[45] Apr. 1, 1975

[54] PHONE COUPLER

[75] Inventor: John P. Kennedy, Columbus, Ohio

[73] Assignee: Design Elements, Inc., Columbus, Ohio

[22] Filed: Jan. 3, 1972

[21] Appl. No.: 214,882

[52] U.S. Cl. .................... 179/1 C

[51] Int. Cl. .................... H04m 1/00

[58] Field of Search .................... 179/1 C, 2 C

[56] References Cited

UNITED STATES PATENTS

| | | | |
|---|---|---|---|
| 3,396,245 | 8/1968 | Flygstad | 179/1 C |
| 3,585,302 | 6/1971 | Swan | 179/1 C |
| 3,592,966 | 7/1971 | Hansen | 179/1 C |
| 3,624,330 | 11/1971 | Bognar | 200/159 R |
| 3,733,437 | 5/1973 | Keith | 179/1 C |
| 3,764,746 | 10/1973 | Libby | 179/1 C |
| D202,191 | 9/1965 | Divietro | 179/1 C |

FOREIGN PATENTS OR APPLICATIONS

| | | | |
|---|---|---|---|
| 532,650 | 8/1955 | Italy | 179/1 C |
| 1,183,332 | 1/1959 | France | 179/1 C |

*Primary Examiner*—Kathleen H. Claffy
*Assistant Examiner*—Douglas W. Olms
*Attorney, Agent, or Firm*—Cennamo Kremblas & Foster

[57] ABSTRACT

A phone coupler for data communication having integrally mounted therein the microphone, an inductive pick-up coil, and an on-off switch. The microphone and pick-up coil are encapsulated into a unitized structure and centrally positioned for utility in the coupler. A spring-positioned button switch protrudes into the phone receiving area of the phone coupler. The button-like protrusion is part of an elongated structure passing through said unitized structure into an actuating position with a micro-switch.

10 Claims, 5 Drawing Figures

PHONE COUPLER

BACKGROUND

Data couplers and apparatus for detachably coupling a data terminal to a standard telephone handset are known to the prior art. Standard telephone networks are often used for communications involving computers, teletype, facsimile or other digital data terminal equipment. Digital data to or from the terminal is modulated on an audio frequency carrier and acoustically coupled to the telephone line. That is, the outgoing signals from a terminal are converted by a suitable transducer to sound which is applied directly to the transmitter portion of a telephone handset. Similarly, incoming data is converted by the telephone handset speaker to sound and reconverted by the acoustic coupler to an electrical signal by means of a suitable microphone pickup mounted near the handset speaker.

Ordinarily, such an acoustic coupler is mounted in a cabinet having a pair of muffling cups which engage the mouthpiece and earpiece ends of a telephone handset. The appropriate acoustic coupler transducers are positioned within these protective muffling cups and are free to transmit or receive their sound directly to or from the handset with reduced interference from exterior noises.

An advantage of the acoustic coupler is that no direct connections need be made to the telephone wires. The telephone handset is merely positioned on the acoustic coupler when the transmission of data is desired. Otherwise, the telephone is free for normal use.

However, the acoustic coupler does have the disadvantages that it is subjected to interference from noise created by surrounding disturbances.

To eliminate ambient noise in the conventional acoustic coupler, the prior art couplers were required to be in intimate acoustic contact with the handset, that is, no air leakage. As mentioned above, the standard telephone is used; however, the standard telephone is really not so standard — there are many variations, sizes and configurations. Ideally then, a coupler must be universally adaptable to all telephones to maintain the aforementioned intimate acoustic contact.

It also has been found that all structures have a resonant frequency of vibration at or near the frequency of the originate or answer frequencies. The resonant vibrations when they do occur provide an intolerable amount of problems.

The prior art standard telephone type of coupler simply has not resolved its adaptability problems. Their use continues to be restricted.

CROSS-REFERENCE

Reference is made to the rubber-like round opening housing for an acoustic coupler disclosed and claimed in co-pending patent application Ser. No. 136,963 filed Apr. 23, 1971 for "Acoustic Coupler."

The configuration described therein has a physical makeup to readily receive and immediately seal in position the telephone. The configuration comprises an elongated upper section of relatively rigid material to hold and secure the telephone. The lower portion of the coupler is separated from the upper portion by a continuous indentation to purposely permit omnidirectional rocking of the upper portion relative to the lower portion. To further assist the rocking and to assure that the telephone can be seated, the lower portion is of a relatively and readily pliable rubber-like material.

Housed in the lower portion of the aforementioned acoustic coupler is the microphone — the actual communication link. The microphone is acoustically positioned in the lower portion of the acoustic coupler much in the same manner as other prior art couplers. But the actual and physical structures and their relationship to one another have not thoroughly and accurately been resolved.

PRIOR COUPLERS

Acoustic coupler of the aforementioned co-pending application and certain other prior art devices have an inductive pick-up. Again, the actual and physical structure and their relationship to one another — for optimum operation with a minimum of transient noises and disturbances have not been thoroughly and accurately resolved.

Another piece of apparatus generally associated with the acoustic coupler is the common on-off switch. In the prior art this switch generally comprises a spring-clip type of terminal contact. The problems and disadvantages of such a switch are known to the art.

SUMMARY OF INVENTION

The present invention comprises an acoustic coupler generally conforming to that of the aforementioned co-pending patent application. Integral with the lower part of the structure, and in acoustic relationship with the upper part of the structure, is a unitized microphone and inductive pick-up coil. The microphone and pick-up coil are centrally located in an encapsulated structure for operation with no resonant or stray vibrations. Passing through the encapsulated communication piece is a spring-positioned switch having a button contact exposed in the upper part of the coupler and an actuating rod in the lower part of the coupler. The actuating rod is in direct contact with a micro-switch for direct on-off action

OBJECTS

It is a primary object of the present invention to provide a new and improved acoustic coupler adaptable for use with all standard telephones.

Another object of the present invention is to provide an acoustic coupler that has no, or only minimum leakage, thereby to eliminate ambient noise and minimize or remove the other known problems encountered with acoustic couplers.

Another object of the present invention is to provide an acoustic coupler that utilizes a direct contact switch thereby eliminating the problems attendant with spring-clip switches.

Another object of the present invention is to provide an acoustic coupler that comprises apparatus in a physical relationship for optimum electrical utility.

A further object is to provide an acoustic coupler having components each of a new and improved design and together of an improved physical relationship.

Further objects and features of the present invention will become apparent from the following detailed description of the preferred embodiment when taken in conjunction with the drawings in which:

DETAILED DESCRIPTION OF DRAWINGS

Figure 1:
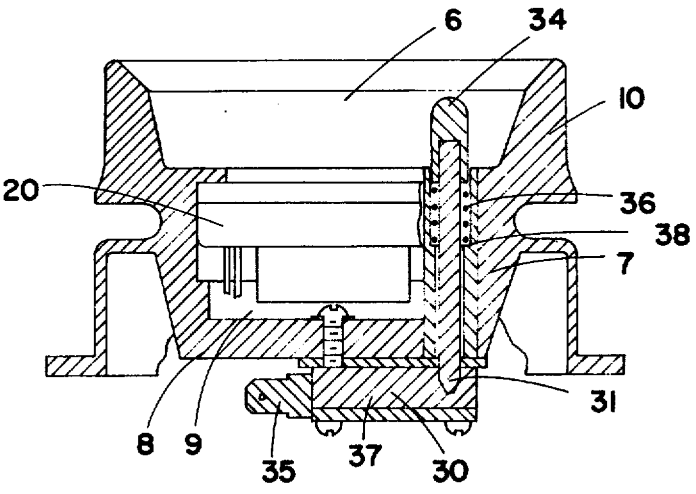
FIG. 1 is a sectional side view of an acoustic coupler, such as that of the aforementioned co-pending application, including the components of the present invention.

Referring now to the drawings, and particularly to the sectional side of FIG. 1, there is shown the acoustic coupler of the aforementioned co-pending application having integrally and acoustically positioned therein the associated apparatus of the present invention. Specifically rubber-like cup 10 has an upper opening 6 and a lower opening 9 together with a base plate 8.

Figure 2:
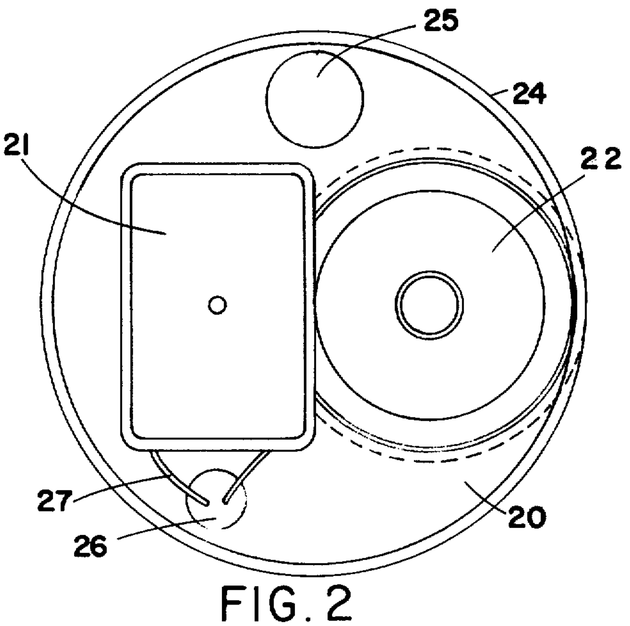
FIG. 2 is a top view of the microphone and pick-up coil unitized structure of the present invention — with its cloth cover removed — incorporated in the acoustic coupler housing of the preferred embodiment of FIG. 1.
Figure 3:
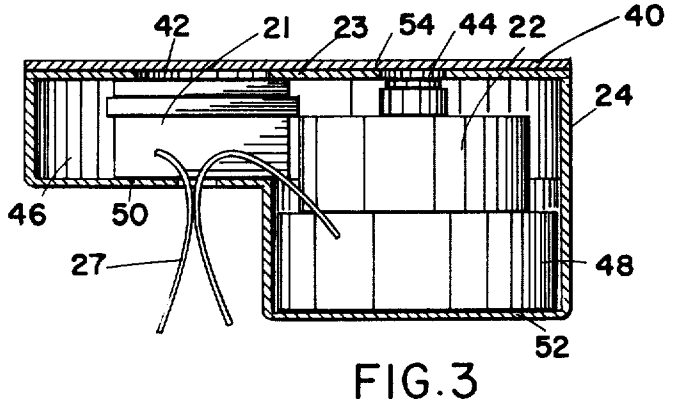
FIG. 3 is a sectional side view of the microphone and pick-up coil unitized structure incorporated in the acoustic coupler housing in accordance with the present invention.

Positioned within the lower opening 9 is the encapsulated unitized structure 20 - more explicitly shown in FIGS. 2 and 3. This structure 20 comprises a microphone 21 and an inductive pick-up coil 22 positioned in a casing 24. Electrical leads 27, connected to the microphone, are fed through an operture 26 for utility.

A circular casing 24 maintains the microphone 21 and inductive pick-up coil 22 in position — relative to one another; and in position relative to the overall coupler. The casing 24 is of a shape and design to snugly fit, without vibration, in that postion of the lower opening 9 of the coupler 10.

With reference to FIG. 3, it is seen that the casing 24 is an enclosure with a lowermost portion of a configuration adapted to receive and retain the particular components. That is, the depth of the casing 24 in the region 46 that encloses the microphone 21 is substantially one-half of that of the depth of the region 48 that encloses the inductive pick-up coil 22.

It is preferred that the microphone 21 be cemented to its base plate 50 of the casing 24; and that the pick-up coil 22 be cemented to its base plate 52. The cementing will assist in restraining movement of the two components with the casing. Positioned on the top of the casing 24 is a cap 23 of plastic or non-metallic material. The cap 23 is of a sufficient thickness to be rigid and maintain in place the microphone 21 and the pick-up coil 22. To permit acoustical utility of the microphone, an aperture 42 is positioned in the cap 23 directly over the microphone 21; also, an aperture 44 is positioned over the pick-up coil 22 for acoustical utility.

To complete the encapsulation of the microphone 21 and pick-up coil 22, there is placed a dust cloth 54 over the entire cap 23 as shown with an exaggerated thickness in FIG. 3. The only break or opening in the cloth cover 54 is the small circular opening 25 to permit the passage of the switch element.

With particular reference again to FIG. 1, there is shown passing through the encapsulated structure 20, through the aperture 25, the switch element 39 interconnecting a pushbutton 32 in the upper part 6 of the coupler and a microswitch 37 in the lower part of the coupler.

Figure 4:
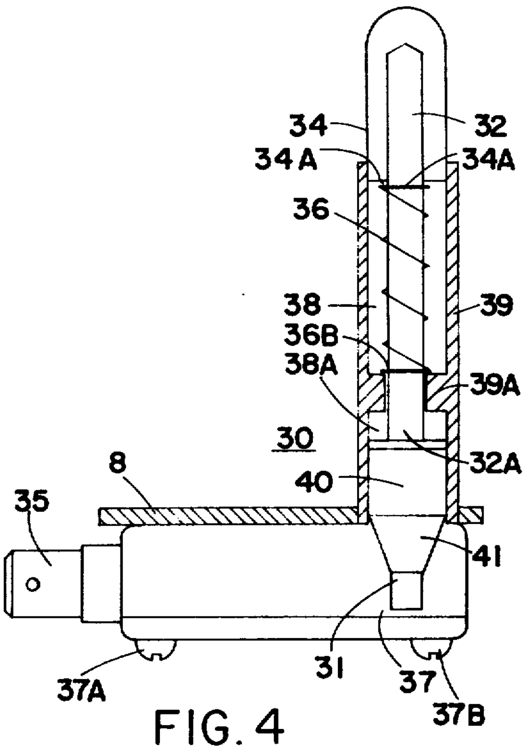
FIG. 4 is an exploded side view of the switch 30 shown in FIG. 1.
Figure 5:
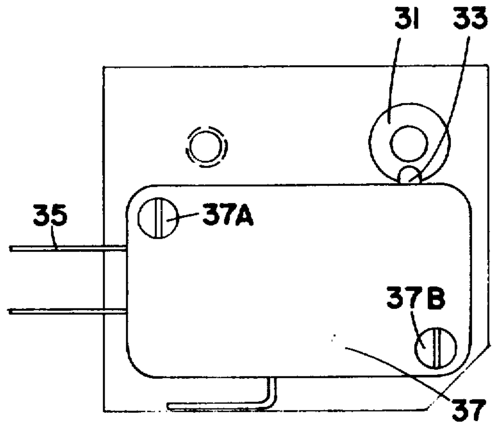
FIG. 5 is an exploded top view of the switch 30 shown in FIG. 1.

With continued reference to FIG. 1 and with specific reference to FIGS. 4 and 5, there is shown the switch 30 of the present invention in substantial detail. A tubular housing 39 has an inwardly protruding shoulder 39*a* in a somewhat midregion. The shoulder 39*a* is not large enough to impede the up and down movement of the rod 32, but is sufficiently large to permit resting thereon spring 36 in the opening 38. The spring 36 has a length just slightly less than the distance between the end piece 34*a* of cap 34 and the shoulder 39*a*. That is, spring 36 has an end washer 36*b* and a top washer 36*a* secured to its two ends. The end washer 36B rests on the shoulder 39*a* and the bottom 34*a* of the cap 34 rests on the washer 36*a*. The length of spring 36 then is sufficient to return the cap 34 to its uppermost position, but yet, sufficiently short to retain the same in the tubular housing 39.

The uppermost spring washer 36*a* is secured to the rod 32; whereas the spring washer 36*b* has an aperture of a sufficient diameter to permit free movement of the rod 32. It can be seen then, in mechanical operation of the push-button switch, depressing cap 34 causes contact betwen the inner-uppermost part of cap 34 and the rod 22. As the button is moved downwardly the spring becomes compressed through contact of washer 36*a*and the lower portion 34*a* of the cap 34 and by contact of washer 36*b* with the shoulder 39*a*.

The lowermost part 32*a* of rod 32 in the lower opening 38*a* of the tubular housing 39 is fixed to the top of a pistonlike element 40; in turn, having a tapered contact portion 41 and an actuator end 31.

Upon depressing the button-cap 34 thereby compressing the spring 36 and pushing downwardly rod 32 the piston 40 in sliding contact with the inner wall of the opening 38*a* is also pushed downwardly. As the push-button is released the piston 40 returns to its original uppermost position.

The micro-switch 37 is fixedly positioned on the underside of the coupler i.e., to the base 8 by screws 37A and 37B. The actual position relative to the underside base 8 is so chosen that the contact 33 is adjacent the actuator end 31. The actuator end 31 is of a substantially lesser diameter than the piston 40 and therefore is not in actual physical touch with the switch contact 33.

The tapered portion of piston 40 has a taper angle sufficiently great to close the opening between the actuator end 31 and the contact 33. That is, the distance between the actuator end 31 and the contact 33 is sufficient to be free of contact therebetween; however, it is less than the diameter of the piston 40. Therefore, the tapered portion 41 has a taper to provide a diaeter less than the tip 31 at one end and a diameter at its other end greater than the distance between tip 31 and the contact 33. It can be seen that by pushing down on the phone-contact button (cap 34) and thereby depressing spring 36 the micro-switch contact 33 will be actuated by engaging the tapered portion 41 on its downward motion. With a release of the pressure on the phone-contact button (cap 34) such as by lifting the phone from the coupler spring 36 forces rod 32 upward which releases and returns the switch to its normal no-connection position.

Although a specific and preferred embodiment has been described it is within the scope of the invention to include variations and modifications.

What is claimed is:

1. Apparatus for coupling a telephone communication terminal to a transmission line including an electro-acoustical transducer and an inductive pick-up coil;

a housing of omnidirectionally movable structure having an upper portion circular opening adapted to receive said terminal, and a lower portion circular opening;

a casing for encapsulating said transducer and inductive pick-up coil, said casing having an outside size adapted to be retained with said lower portion circular opening; said casing having a pair of discontinuities to permit electro-acoustical communication with said terminal;

said casing including means for fixedly positioning said transducer and inductive pick-up coil therein; and a switch for actuating said terminal fixedly positioned at a lowermost region of said housing and having contact means positioned in the uppermost portion of the housing.

2. Apparatus as set forth in claim 1 wherein said casing has a varying depth to accommodate the varying sized components retained therein.

3. Apparatus as set forth in claim 1 wherein said casing has a non-metallic cap and wherein said discontinuities are a pair of apertures.

4. Apparatus as set forth in claim 3 wherein said casing has another opening to permit the passage of said contact means from one opening of said housing to another.

5. Apparatus as set forth in claim 2 wherein said means for fixedly positioning said transducer and receiver comprises cementing said transducer to one depth of said casing and cementing the inductive pick-up coil to the other depth of said casing.

6. Apparatus as set forth in claim 1 wherein said switch includes a body portion with a contact positioned in the lower opening of said housing and a push button extending from its one end adjacent said contact to its other end in the upper opening of said housing to be actuated by said terminal.

7. Apparatus as set forth in claim 6 wherein said push-button comprises an elongated structure, a cap fitted at the top end, and a rod adjacent said contact at its other end, a spring positioned in said elongated structure to return said push-button to an original position.

8. Apparatus as set forth in claim 7 further comprising means for joining said spring to one end of said rod and means for retaining said spring in said elongated structure.

9. Apparatus as set forth in claim 7 wherein said rod has positioned at its one end an element having a taper to physically engage said contact when it is moved downwardly.

10. Apparatus as set forth in claim 7 wherein said elongated structure extends through said aperture in said casing and wherein said cap to said housing protrudes into the upper portion of said housing.

* * * * *